(12) United States Patent
Neyme

(10) Patent No.: US 9,194,403 B2
(45) Date of Patent: Nov. 24, 2015

(54) MODULAR HINGED JOINT FOR USE WITH AGONIST-ANTAGONIST TENSILE INPUTS

(71) Applicant: Dylan Pierre Neyme, Salt Lake City, UT (US)

(72) Inventor: Dylan Pierre Neyme, Salt Lake City, UT (US)

( * ) Notice: Subject to any disclaimer, the term of this patent is extended or adjusted under 35 U.S.C. 154(b) by 162 days.

(21) Appl. No.: 14/187,274

(22) Filed: Feb. 23, 2014

(65) Prior Publication Data

US 2015/0240842 A1   Aug. 27, 2015

(51) Int. Cl.
*F15B 15/10* (2006.01)
*B25J 9/10* (2006.01)
*B25J 9/14* (2006.01)

(52) U.S. Cl.
CPC .............. *F15B 15/103* (2013.01); *B25J 9/1075* (2013.01); *B25J 9/142* (2013.01)

(58) Field of Classification Search
CPC ...... B25J 9/1075; B25J 9/142; B25J 17/0275; F15B 15/103
USPC ........ 60/581; 403/31, 81, 150–159, 161–163; 92/92; 74/490.04, 490.5
See application file for complete search history.

(56) References Cited

U.S. PATENT DOCUMENTS

| | | | |
|---|---|---|---|
| 2,345,650 A | 4/1944 | Attwood | |
| 2,844,126 A | 7/1958 | Gaylord | |
| 3,267,816 A | 8/1966 | Graham | |
| 3,267,817 A | 8/1966 | Adams | |
| 3,448,626 A | 6/1969 | Yeatman et al. | |
| 3,513,606 A | 5/1970 | Jones | |
| 3,837,009 A | 9/1974 | Walker | |
| 4,078,670 A * | 3/1978 | Francois | B25J 3/04 414/4 |
| 4,349,922 A * | 9/1982 | Agee | A61F 2/384 623/23.39 |
| 4,615,260 A | 10/1986 | Takagi et al. | |
| 4,689,538 A * | 8/1987 | Sakaguchi | B25J 9/046 318/568.21 |
| 4,733,603 A | 3/1988 | Kukolj | |
| 4,739,692 A | 4/1988 | Wassam et al. | |
| 4,819,547 A | 4/1989 | Kukolj | |
| 4,834,761 A * | 5/1989 | Walters | B25J 9/104 254/228 |
| 4,964,061 A | 10/1990 | Grodski et al. | |
| 6,067,892 A | 5/2000 | Erickson | |
| 6,223,648 B1 | 5/2001 | Erickson | |
| 6,478,652 B1 * | 11/2002 | Van der Linde | A63H 11/18 446/330 |
| 6,485,519 B2 | 11/2002 | Meyers et al. | |
| 7,191,696 B2 | 3/2007 | Morr et al. | |
| RE39,961 E * | 12/2007 | Petrofsky | A61F 2/68 188/282.3 |
| 7,367,245 B2 * | 5/2008 | Okazaki | B25J 9/104 74/490.04 |
| 7,555,969 B2 * | 7/2009 | Okazaki | B25J 9/1075 74/490.05 |
| 7,837,144 B2 | 11/2010 | Kothera et al. | |
| 8,127,659 B2 | 3/2012 | Okazaki | |
| 8,201,473 B2 * | 6/2012 | Knoll | A61B 1/00156 74/490.05 |
| 8,470,048 B2 * | 6/2013 | Wolfson | A61F 2/3836 623/20.15 |

(Continued)

OTHER PUBLICATIONS

80/20 Inc., Catalog 18, pp. 641, 717, 737, 738.

(Continued)

*Primary Examiner* — Joshua Kennedy

(57) ABSTRACT

A modular hinged joint which attaches to the end of a structural member converts agonist-antagonist tensile forces to either side of a cord into a torque in a second structural member. Plain bearing surfaces with hour-glass shaped profiles maintain the alignment of the joint tensile forces are applied to the cord. Tensile forces introduced from the cord are resolved within the joint, reducing the robustness demand on the attachment to the second structural member. A pin-type fastener ensures that the joint remains intact when tensile forces to the cord are absent.

9 Claims, 7 Drawing Sheets

(56) References Cited

U.S. PATENT DOCUMENTS

| | | | | |
|---|---|---|---|---|
| 8,500,823 | B2* | 8/2013 | Herr et al. | A61F 2/64 623/24 |
| 8,701,545 | B2* | 4/2014 | Kudawara | B25J 9/1075 417/480 |
| 8,870,967 | B2* | 10/2014 | Herr | A61F 2/60 601/5 |
| 8,904,919 | B2* | 12/2014 | Woods | A61F 2/08 92/92 |
| 2012/0017718 | A1* | 1/2012 | Greenhill | B25J 5/00 74/490.05 |

OTHER PUBLICATIONS

Bosch Rexroth Corp., Aluminum Structural Framing System Version 7.0, Catalog, 2007, p. 3-29.

Festo AG & Co. KG, Fluidic Muscle DMSP— . . . /MAS— . . . , 757268d6.

* cited by examiner

MODULAR HINGED JOINT FOR USE WITH AGONIST-ANTAGONIST TENSILE INPUTS

BACKGROUND

Prior Art

The following is a tabulation of some prior art that presently appears relevant.

| U.S. Patents | | |
|---|---|---|
| Patent Number | Issue Date | Patentee |
| 2,345,650 | Apr. 4, 1944 | C. W. Attwood |
| 2,844,126 | Jul. 22, 1958 | R. H. Gaylord |
| 3,267,816 | Aug. 23, 1966 | Charles H. Graham |
| 3,267,817 | Aug. 23, 1966 | Rudolph R. Adams |
| 3,448,626 | Jun. 10, 1969 | Yeatman et al. |
| 3,513,606 | May 26, 1970 | V. H. Jones |
| 3,837,009 | Sept. 24, 1974 | Peter. S. Walker |
| 4,615,260 | Oct. 7, 1986 | Takagi et al. |
| 4,733,603 | Mar. 29, 1988 | Mirko Kukolj |
| 4,739,692 | Apr. 26, 1988 | Wassam et al. |
| 4,819,547 | Apr. 11, 1989 | Mirko Kukolj |
| 4,964,061 | Oct. 16, 1990 | Grodski et al. |
| 6,067,892 | May 30, 2000 | Joel R. Erickson |
| 6,223,648 | May 1, 2001 | Joel R. Erickson |
| 6,485,519 | Nov. 26, 2002 | Meyers et al. |
| 7,191,696 | Mar. 20, 2007 | Morr et al. |
| 7,837,144 | Nov. 23, 2010 | Kothera et al. |
| 8,127,659 | Mar. 6, 2012 | Yasunao Okazaki |

Nonpatent Literature Documents

80/20 Inc. Catalog 18, Pages 641, 717, 737, 738
Bosch Rexroth Corp. *Aluminum Structural Framing System Version* 7.0 (2007), Page 3-29
Festo AG & Co. KG *Fluidic Muscle DMSP-* . . . */MAS-* . . . 757268d6

BACKGROUND

The fluidic muscle concept as in U.S. Pat. No. 2,844,126 to Gaylord (1955) has struggled to gain widespread acceptance as an actuator in industry. At least one embodiment of the fluidic muscle has become commercialized in recent decades by Festo AG & Co. Despite several advantages of these actuators over traditional piston-driven linear pneumatic actuators, they have remained obscure.

This paradox is better understood by attempting to design an industrial mechanical system which uses these muscles to produce a rotation. Until now, the implementation of these muscles into a rotary actuator has required either an extensive design effort involving the design of levers and hinges, or the use of hardware which is not suited to the special requirements which arise from the large tensile forces induced by these muscles. Although the concept of a rotary actuator which is activated by a pair of muscles has been extensively explored as in U.S. Pat. No. 7,837,144 to Kothera et al. (2010), U.S. Pat. No. 4,739,692 to Wassam et al. (1988), U.S. Pat. No. 4,615,260 to Takagi et al. (1986), U.S. Pat. Nos. 4,733,603 and 4,819,547 to Kukolj (1988 and 1989 respectively), U.S. Pat. Nos. 6,067,892 and 6,223,648 to Erickson (2000 and 2001 respectively) and U.S. Pat. No. 8,127,659 to Okazaki (2012), there has not existed an easy-to-implement, prepackaged hinge-actuator solution which enables a muscle actuator pair to be easily implemented into a rotary actuator.

There are several modular systems in wide use within the field of industrial automation. One of the most widely used systems is the t-slotted system which has evolved since U.S. Pat. No. 3,513,606 to V. H. Jones (1968) into a large array of extrusion profiles and accessories produced by a variety of manufacturers such as 8020 ® Inc., Bosh Rexroth, and Tslots™. Components exist within these and other standard toolboxes which can be assembled into a rotary actuator, but the large tensile forces applied by pneumatic muscles preclude using standard components to form a long-lasting, robust joint.

The subject of agonist-antagonist paired, tensile driven rotary actuators has been explored in U.S. Pat. No. 3,267,816 to Graham (1966), U.S. Pat. No. 3,448,626 to Yeatman et al. (1969), U.S. Pat. No. 6,860,189 to Perez (2005), and U.S. Pat. No. 7,191,696 to Morr et al. (2007), however these deal with self-contained units which are not generally suitable to accept the relatively long pneumatic muscles and fail to provide a lightweight, simple connection which stabilizes itself under load.

In the field of prosthetic joint replacement, U.S. Pat. No. 3,837,009 to Walker (1974), U.S. Pat. Nos. 4,081,866 6,485,519 to Upshaw et al. (1978), and to Meyers et al. (2002) illustrate simple, self-stabilizing joints which are designed for use with tensile actuation. The concept has not previously extended to modular industrial systems.

Advantages

The present hinge joint originates from an attempt to integrate pneumatic muscles into a rotary actuator which would operate in an ocean environment. This embodiment of the joint has few parts which move relative to each other, and can be made very corrosion resistant through choice of materials and coatings. The large bearing surfaces spread out the induced compressive force between the bearing faces. The large forces which are introduced into the hinge by the cord are completely resolved within the joint itself, transmitting only a torque and any stabilizing forces to the next member.

The joint is self-stabilizing. It allows machine designers to easily construct a rotary actuator using tensile actuators without resorting to special hinge design for each joint. Actuators assembled with this hinge system can be easily dismantled by use of a single pin and cord disconnects. This joint is easy and cheap to replace without modifying surrounding structure.

SUMMARY

One embodiment of the present joint facilitates the integration of pneumatic muscles or other tensile agonist-antagonist actuators in a modular way by using an existing industrial toolkit coupled with a biological hinge solution which occurs widely in the nature within the joints of tetrapods to produce a rigid, self-stabilizing rotary actuator.

BRIEF DESCRIPTION OF DRAWINGS

The invention is illustrated by the accompanying drawings in which corresponding parts are identified by the same numerals and in which.

GLOSSARY

Figure 1:
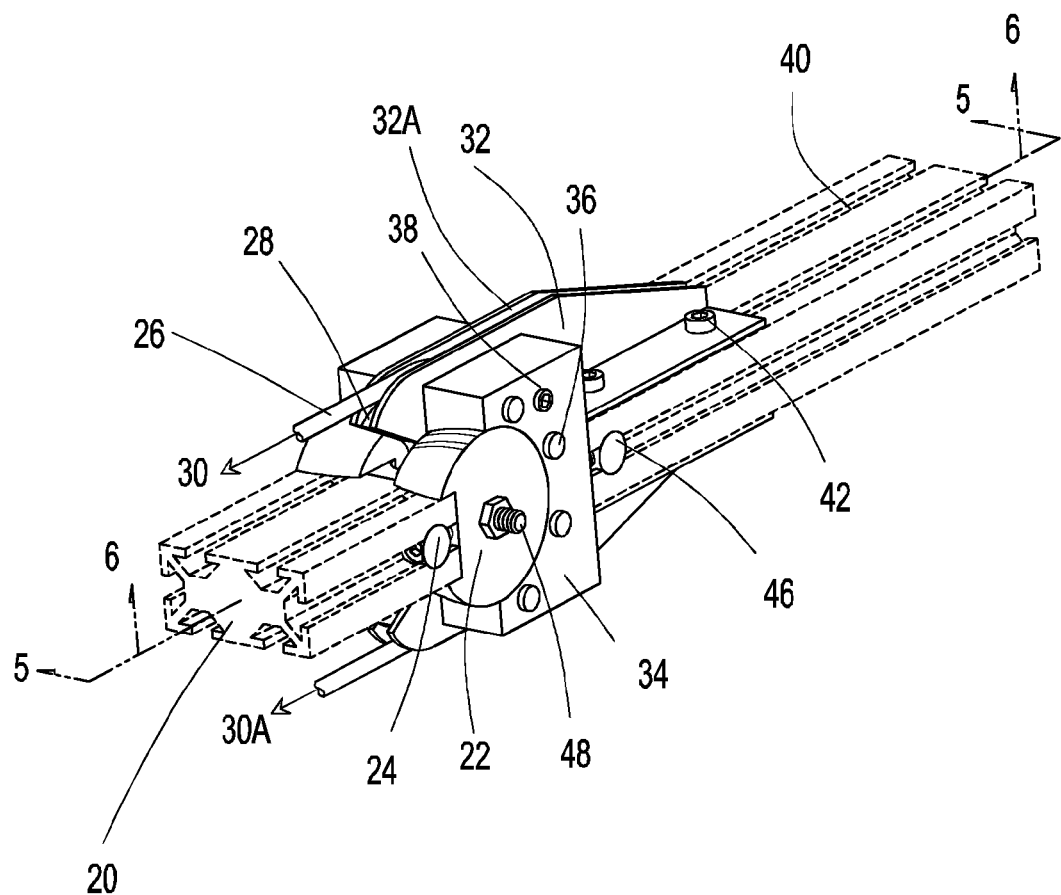
FIG. 1 is a perspective view of the first embodiment
Figure 2:
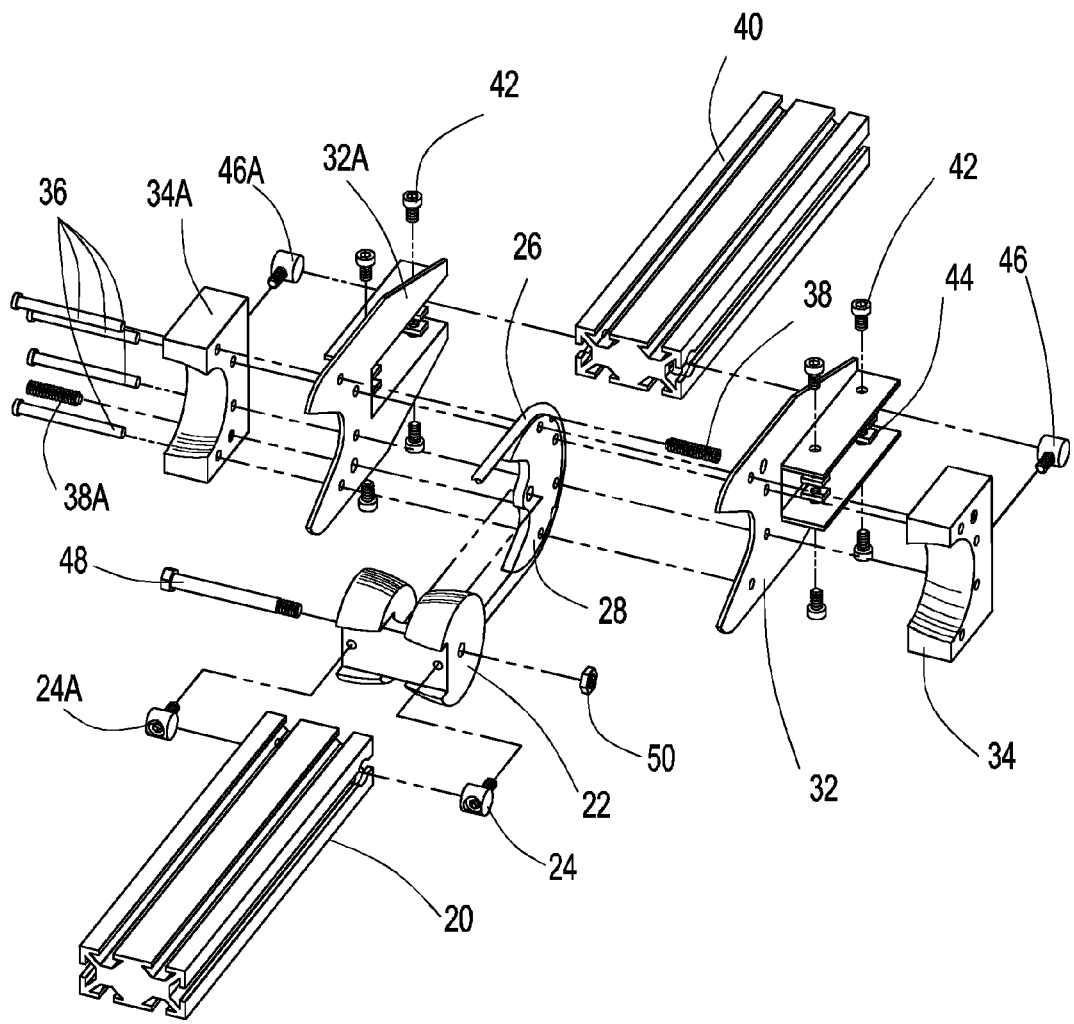
FIG. 2 is an exploded view demonstrating the first embodiment
Figure 3:
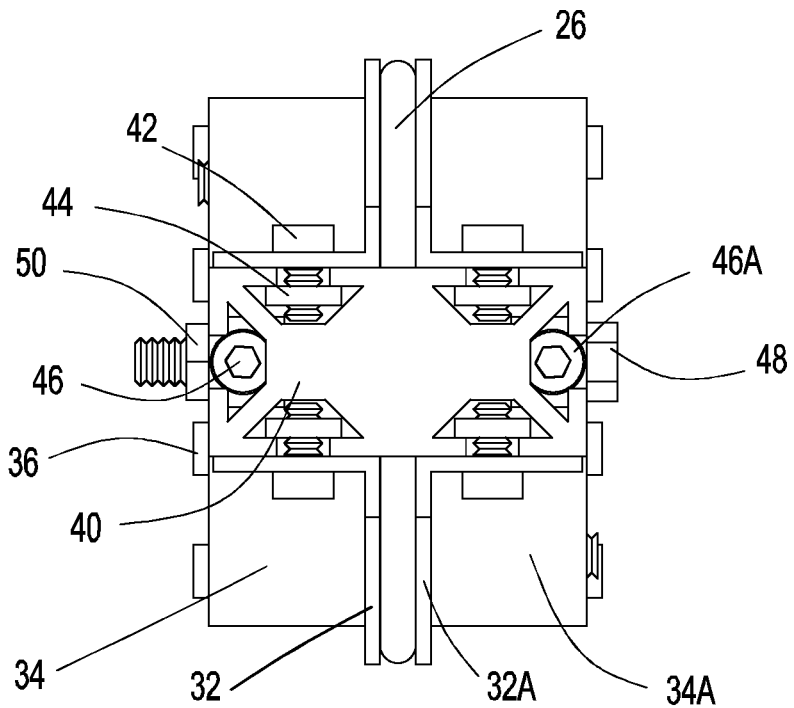
FIG. 3 is an end view of the first embodiment
Figure 4:
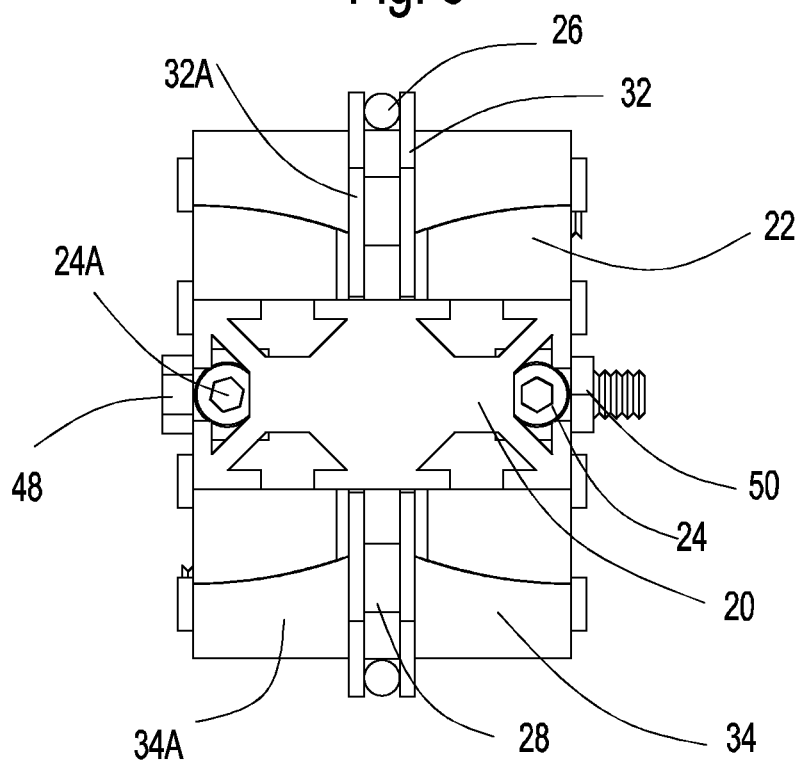
FIG. 4 is a view of the first embodiment opposite the end of FIG. 2

The following list defines some of the terms as they are used in the following description.

Clevis Connection—A connection used to attach a cord to an actuator for the purpose of applying a tensile force Condyle—In biology, the rounded prominence which occurs at the end of a bone, and is associated with a joint. In the sense of this joint, the condyle is a convex prominence which has a shape formed by revolution about the center of the joint's axis of rotation. The diameter of the condyle is smaller toward the centerline of the joint and grows larger farther away from the centerline of the joint. The condyle may take a form that is recognized as roughly conical to roughly spherical.

Condyle Set—A connected set of two condyles which are placed in opposition such that the diameter is relatively smaller in the center. This can be described as roughly hourglass in shape with a slot cut in the center. The revolved section does not extend around a full revolution, but need only comprise an arc sufficient to accommodate the necessary rotation of the joint.

Cord—A member which is flexible in bending, but rigid and strong when subjected to a tensile force. A cord, for the purpose of this joint may be a cord, cable, webbing, chain, or other similar member.

Fluidic Muscle—An actuator which is designed to contract when subjected to a pneumatic, hydraulic, or other fluidic pressure.

Pin-type Fastener—A fastener with a long, smooth shank. This fastener serves to prevent the separation of two members in shear. This pin-type fastener allows free rotation between members but is not designed to be a bearing surface in itself.

Pulley—For the purpose of this joint, a pulley is a partially circular member around which the cord passes. A hole is located coaxially to the center of the outer circular portion of the pulley.

Shear Fastener—A fastener which is meant to transfer a shear force which may be repetitive or oscillatory in nature. Examples of shear fasteners are rivets, adhesives, aerospace bolts and dowel pins.

Socket—A plain bearing receptacle into which a condyle fits.

T-slotted extrusion—Any extrusion which comprises a plurality of t-shaped slots, into which t-nuts may be inserted for the purpose of fastening other members by bolts threaded into these t-nuts.

T-nut—A threaded nut which fits into a t-slot and which may slide freely when not tightened, but which is constrained against rotating within the t-slot.

Torque Arm—In the context of this joint, a member which transmits torque into a member which is to be rotated.

Drawings - Reference Numerals

| 20 | t-slotted base extrusion | 22 | condyle set |
|---|---|---|---|
| 22' | condyle set | 24 | anchor fastener |
| 24A | anchor fastener | 26 | cord |
| 28 | pulley | 30 | tensile force |
| 30A | tensile force | 32 | torque arm |
| 32A | torque arm | 34 | socket |
| 34A | socket | 36 | shear fastener |
| 38 | set screw | 38A | set screw |
| 40 | rotating t-slotted extrusion | 42 | bolts |
| 42A | bolts | 44 | t-nuts |
| 44A | t-nuts | 46 | anchor fastener |
| 46A | anchor fastener | 48 | pin type fastener |
| 50 | retainer | 51 | fluidic muscle |
| 51A | fluidic muscle | 52 | clevis connection |
| 52A | clevis connection | 54 | muscle base connection |
| 54A | muscle base connection | 56 | supply pressure |
| 58 | power pressure regulator | 60 | power pressure reservoir |
| 62 | slack takeup pressure regulator | | |
| 64 | slack takeup pressure reservoir | | |
| 66 | muscle selection valve | 68 | pressure selection valve |
| 68A | pressure selection valve | | |
| 70 | exhaust to atmospheric pressure | | |
| 72 | torque arm | 72A | torque arm |
| 74 | rotating t-slotted extrusion | 80 | base tube |
| 82 | condyle set | 84 | set screw |
| 86 | cord | 88 | pulley |
| 90 | tensile force | 90A | tensile force |
| 92 | torque arm set | 94 | socket |
| 94A | socket | 96 | shear fastener |
| 98 | set screw | 98A | set screw |
| 100 | rotating tube | 102 | shear fasteners |
| 104 | nuts | 106 | pin-type fastener |
| 108 | retainers | | |

Detailed Description of First Embodiment

FIGS. 1-6

FIG. 1 shows a view of the first embodiment of the hinged joint where the actuator is roughly centered within its stroke. A T-slotted base extrusion 20 is assumed to be fixed. The base extrusion 20 as shown in this embodiment is of the type which is twice as wide on the broader face as on the smaller face. It has twice the number of T-slots on this broader face as on the narrower face. A condyle set 22 is affixed to the end of base extrusion 20 with anchor fastener 24. This anchor fastener 24 is comprised of a barrel with a hole transverse to the barrel diameter, through which a bolt is inserted. Anchor fastener 24 is inserted into a hole which is cut into extrusion 20 at an appropriate distance from the end of the extrusion. The bolt introduced into anchor fastener 24 is threaded into a tapped hole in condyle set 22 such that the condyle set 22 and the extrusion 20 will be tightly locked together on one side of the extrusion 20. This means of attachment is repeated on the other side of extrusion 20 with a second anchor fastener 24A which allows the condyle set 22 to be fixed in two locations to extrusion 20.

Cord 26 passes around pulley 28, and is subjected to tensile forces 30 and 30A which are applied by a force external to the hinge joint. These tensile forces 30 and 30A may be induced by an actuator acting against T-slotted base extrusion 20, or by some exterior means including but not limited to a tension induced by weight, spring, or damper.

Pulley 28 is sandwiched between torque arms 32 and 32A. To the outside of torque arm 32 is socket 34, with a corresponding socket 34A located next to 32A. Pin-type shear fasteners such as rivets or bolts are used to fasten this assembly together. Set screw 38 is threaded into a tapped hole in socket 34, immobilizing cord 26 against torque arm 32A in order to provide a resistance against the slippage of cord 26 with respect to pulley 28. Similarly, set screw 38A is threaded into a tapped hole in socket 34A, immobilizing cord 26 against torque arm 32.

Rotating t-slotted extrusion 40 is affixed to torque arm 32 with of bolts 42 which pass through holes in torque arm 32 and which are threaded into t-nuts 44 which are inserted into slots in rotating t-slotted extrusion 40. Similarly, bolts 42A pass through holes in torque arm 32A, threading into t-nuts 44A, thus affixing torque arm 32A to rotating t-slotted extrusion 40.

Socket 34 is attached to rotating t-slotted extrusion 40 with anchor fastener 46 in the same manner as fixed t-slotted base 20 is attached to condyle set 22 as described above. Socket 34A is attached to t-slotted extrusion 40 with anchor fastener 46A in this same way.

The first embodiment of the hinge now is comprised of two major subassemblies. Omitting fasteners for the sake of clarity, the first subassembly is comprised of t-slotted base extrusion 20 attached rigidly to condyle set 22. The second subassembly is comprised of socket 34A, torque arm 32A, pulley 28, torque arm 32, and socket 34, all rigidly attached to rotating t-slotted extrusion 40 with cord 26 passing around the back side of pulley 28.

To connect the first and the second subassemblies of the first embodiment, socket 34A and socket 34 are brought into contact with the corresponding faces of condyle set 22. A pin-style fastener 48 is inserted through holes provided in condyle set 22 and pulley 28. This pin-style fastener 48 is meant to contact only condyle set 22, and so the hole in pulley 28 through which fastener 48 passes must be sufficiently large, and located in such a way that no interference is encountered during pivoting motion while cord 26 is subject to tensile loads.

Figure 5:
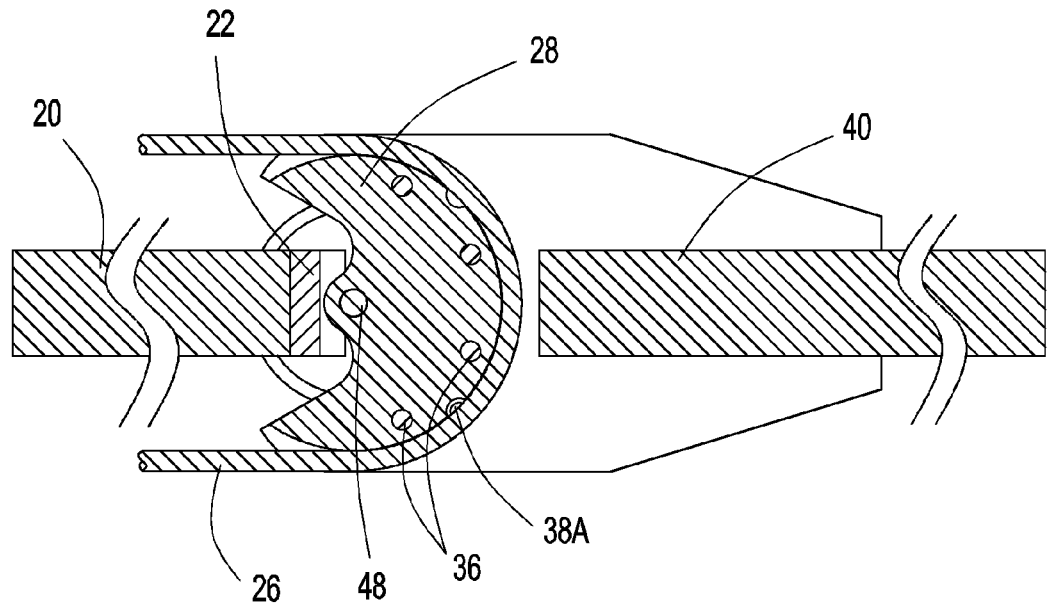
FIG. 5 is a section view of the first embodiment along section plane indicated in FIG. 1.

FIG. 5 is a section view which demonstrates the manner in which cord 26 passes around pulley 28.

Figure 6:
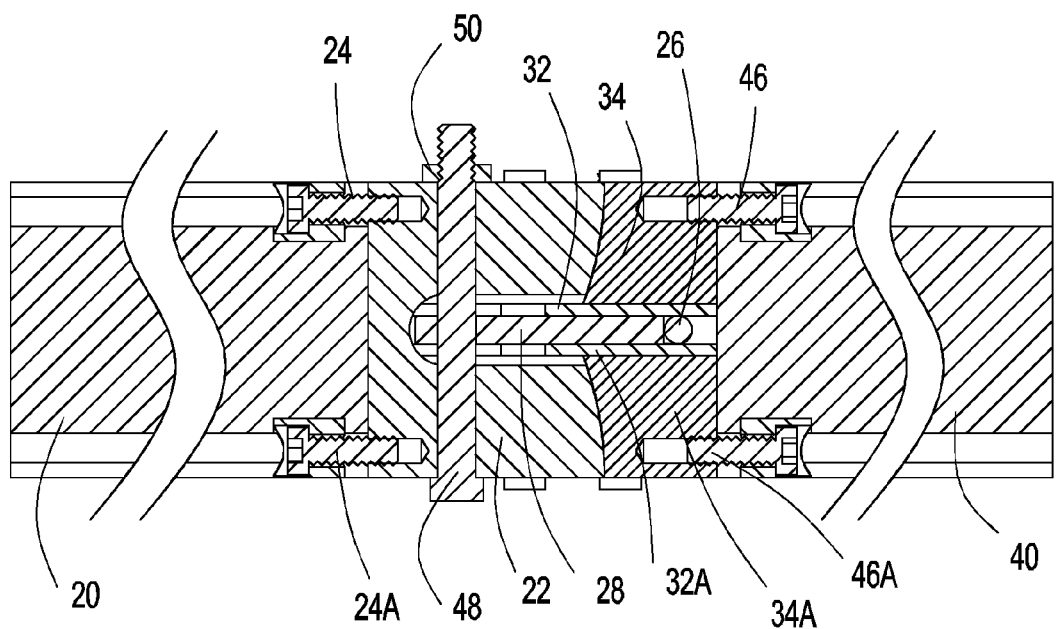
FIG. 6 is a section view of the first embodiment oriented at a right angle to FIG. 5.

FIG. 6 is a section view which illustrates the main load-bearing contact surface which allows the relative motion of the two subassemblies which were retained by pin-type fastener 48 as described above. The two spherical portions of condyle set 22 contact directly with corresponding bearing surfaces on sockets 34 and 34A respectively. The opposed condyle arrangement ensures that the compressive forces between sockets 34 and 34A, and condyle set 22 induce a stabilizing influence on the joint. Thus, as tensile forces 30 and 30A acting on cord 26 grow larger, sockets 34 and 34A are drawn more tightly against condyle set 22, providing increasing stability against cocking or shifting of the joint. The large contact surface area of condyle set 22 against sockets 34 and 34A lowers the contact stresses within the joint as compared to a simple hinged joint or a joint with rolling elements.

Some notes regarding the construction of the various components are as follows:

T-slotted base extrusion 20 and rotating t-slotted extrusion 40 are envisioned to be a standardized aluminum extrusion as sold commercially by a variety of vendors, but may be constructed from any of a variety of structural materials such as carbon fiber or steel.

Condyle set 22 is shown in FIGS. 1-6 with a flat cutout which matches fixed t-slotted extrusion 20. A similar condyle set 22' is shown with an extended section rather than a cutout in FIG. 7. The joint between condyle set 22 and fixed t-slotted extrusion 20 can take any shape which is appropriate for a rigid compressive joint. This could include a v-shaped or rounded joint.

A cutout in the center of condyle set 22 allows pulley 28 to be captured with pin-type fastener 48. Condyle set 22 is envisioned to be constructed of aluminum which is hard anodized, but may also be constructed of other metals or materials such as glass or carbon reinforced plastic composite. The spherical or conical portions of condyle set, which are the bearing surfaces, are hard and smooth.

Anchor fasteners 24, 24A, 46, and 46A are fasteners which are commonly available from several t-slot extrusion manufacturers.

Cord 26 is envisioned to take the form of either a rope or braided webbing. The cord 26 may be made from aramid fiber or Ultra High Molecular Weight Polyethylene (UHMWP) as used in modern sailing, fishing, and paragliding ropes and cords. The cord may also be made from metal or other similar material which offers a high strength and minimal elongation when subjected to a tensile force, but relatively greater flexibility in bending.

Pulley 28 may be constructed of aluminum, composite materials, or a variety of plastics or metals. This pulley 28 holds the cord an appropriate distance from the center of the pivot such that a torque is induced when tensile forces 30 and 30A are unequal.

Torque arms 32 and 32A are envisioned to be constructed of sheet aluminum or other suitable metal, but may be made from composite materials as well.

Sockets 34 and 34A must be constructed such that the conical or spherical shape of condyle set 22 matches the respective conical or spherical shape of each socket 34 and 34A. The surface area of sockets 34 and 34A which comes into contact with condyle set 22 should be made from a material which is suitable for plain bearings. Sockets 34 and 34A may be made from a slippery material such as polytetrafluoroethylene (ptfe)-impregnated acetal composite, or they may be constructed from a more structural material such as reinforced plastic composite, aluminum, or other material, and subsequently coated on the contact surfaces with a slippery and durable material. This slippery coating may take the form of a commercially available ptfe composite tape with adhesive backing. Many plain bearing surfaces will also work for this purpose.

Set screws 38 and 38A are envisioned to take the form of standard set screws with a flat or rounded point to avoid damage to the cord 26. Set screws 38 and 38A may however take the form of a u-shaped bolt or other means whereby cord 26 is prevented from slipping with respect to pulley 28.

Shear fasteners 36 transmit the shear force which originates from tensile forces 30 and 30A from pulley 28 through to sockets 34 and 34A. This is envisioned as a series of shear fasteners which pass tightly through holes in pulley 28, torque arms 32 and 32A, and sockets 34 and 34A. The function of shear fasteners 36 may also be accomplished by use of an adhesive bond, welding, or through combining some combination of pulley 28, torque arms 32 and 32A, and meniscal sockets 34 and 34A into a single part.

T-nuts 44 are envisioned to be commercially available t-nuts which are widely used in conjunction with t-slotted extrusions.

Pin-type fastener 48 serves to retain condyle set 22 with pulley 28 in the event that tensile forces 30 or 30A are absent or minimal. To retain condyle set 22 to pulley 28 without damaging the pulley 28, the portion of pin-type fastener 48 which passes through pulley 28 should be smooth rather than threaded.

Pin-type fastener 48 and retainer 50 resist the prying force which is induced by sockets 34 and 34A on condyle set 22.

Excessive axial play should be removed by snugging retainer 50 to fastener 48, sandwiching condyle set 22 in between.

Operation

The operation of this embodiment of the joint is as follows:

When cord 26 is subjected to equal tensile forces 30 and 30A with fixed t-slotted extrusion 20 constrained against moving, cord 26 imparts a shear force which is transmitted by shear fasteners 36 to sockets 34 and 34A. These sockets 34 and 34A press directly against corresponding mating surfaces of condyle set 22, which in turn are reacted by fixed t-slotted extrusion 20. Due to the spherical or conical geometry of the mating surfaces of condyle set 22 with sockets 34 and 34A as illustrated in the section view of FIG. 6, it can be seen that the joint will tend to self-align because any deviation from the aligned position results in an extension in the cord 26.

When cord 26 is subjected to tensile force 30, which is greater than tensile force 30A, cord 26 is prevented from sliding freely on pulley 28 because set screw 38 clamps cord 26 against torque arm 32A and set screw 38A clamps against torque arm 32. The difference of tensile force 30 and tensile force 30A is transmitted as a torque about the rotational center of the joint into torque arms 32 and 32A. This torque is then transmitted into rotating t-slotted extrusion 40 via flanges on the torque arms 32 and 32A which are attached to rotating t-slotted extrusion 40 by bolts 42 with t-nuts 44 inserted into the slots of this rotating t-slotted extrusion Anchor fasteners 46 and 46A help to keep rotating t-slotted extrusion 40 snugly fastened against sockets 34 and 34A, providing a direct load path for forces and torques coming from rotating t-slotted extrusion 40 through sockets 34 and 34A, through the main bearing surface into condyle set 22, and hence directly into fixed t-slotted extrusion 20.

Figure 7:
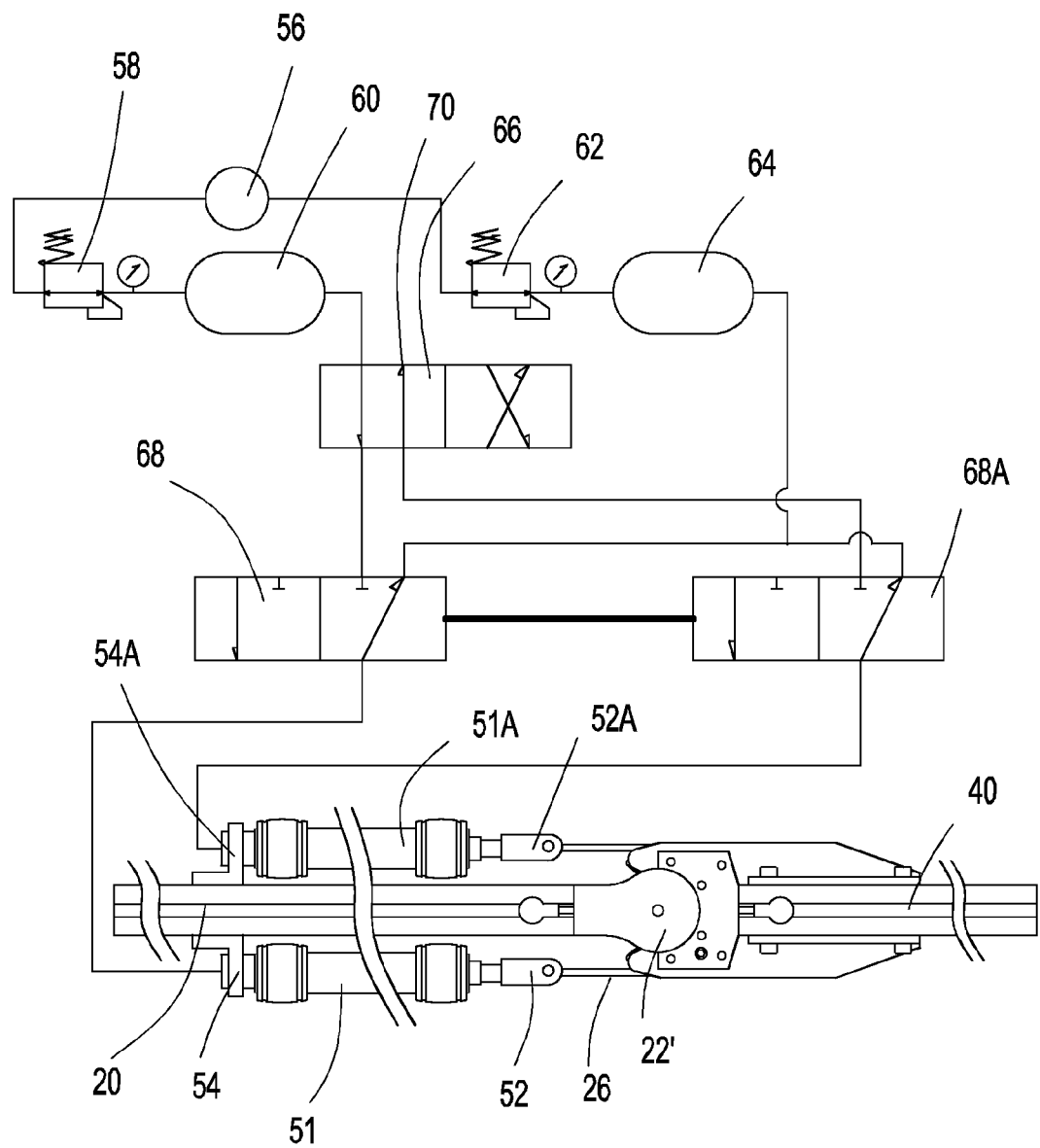
FIG. 7 shows one implementation of the second embodiment including attachment, forces, and pneumatic system.

FIG. 7 shows a second embodiment of the joint as it may be employed for use with a pneumatic system using fluidic muscles for actuation. The joint is constructed exactly as in the first embodiment with one exception: A slightly elongated section of condyle set 22' as compared with the recessed cutout of condyle set 22 in FIGS. 1-6. Cord 26 is attached via clevis 52 to fluidic muscle 51, which in turn is attached to t-slotted extrusion 20 via a muscle base connection 54. This sequence is repeated on the side opposite the t-slotted extrusion 20 from fluidic muscle 51 with the other end of cord 26 being attached to clevis 52A. This clevis 52A connects to fluidic muscle 51A, which in turn is connected to t-slotted extrusion 20 by muscle base connection 54A. These two muscle base connections 54 and 54A may be constructed such that they attach by bolts and t-nuts into t-slotted extrusion 20, or they may form one part which reaches around the side of the t-slotted extrusion 20.

The system shown in FIG. 7 is representative of a simple system by which the joint can be implemented as a rotary actuator. The system as shown is supplied air pressure 56. This supplied air pressure 56 is regulated by power pressure regulator 58 to fill power pressure reservoir 60. Air from power air reservoir 60 forms one of the two inputs to the 4 way muscle selection valve 66, with the other input being exhaust to atmospheric pressure. Of the two outputs of muscle selection valve 66, one leads to valve 68 and the other to valve 68A. These valves 68 and 68A are mechanically connected such that they will always shift at the same time. When valves 68 and 68A are both directed to receive input from muscle selection valve 66, cycling muscle selection valve 66 will cause fluidic muscle 51 to contract while fluidic muscle 51A is relaxed. Cycling muscle selection valve 66 in the opposite direction will cause fluidic muscle 51A to contract while fluidic muscle 51 is relaxed.

In parallel to power pressure regulator 58, supply air pressure 56 is regulated by slack takeup regulator 62, filling slack takeup reservoir 64. When valves 68 and 68A are both directed to receive input from slack takeup reservoir 64, fluidic muscles 51 and 51A each contract an equal amount in order to hold the joint centered, such that no slack exists in cord 26.

Third Embodiment

Figure 8:
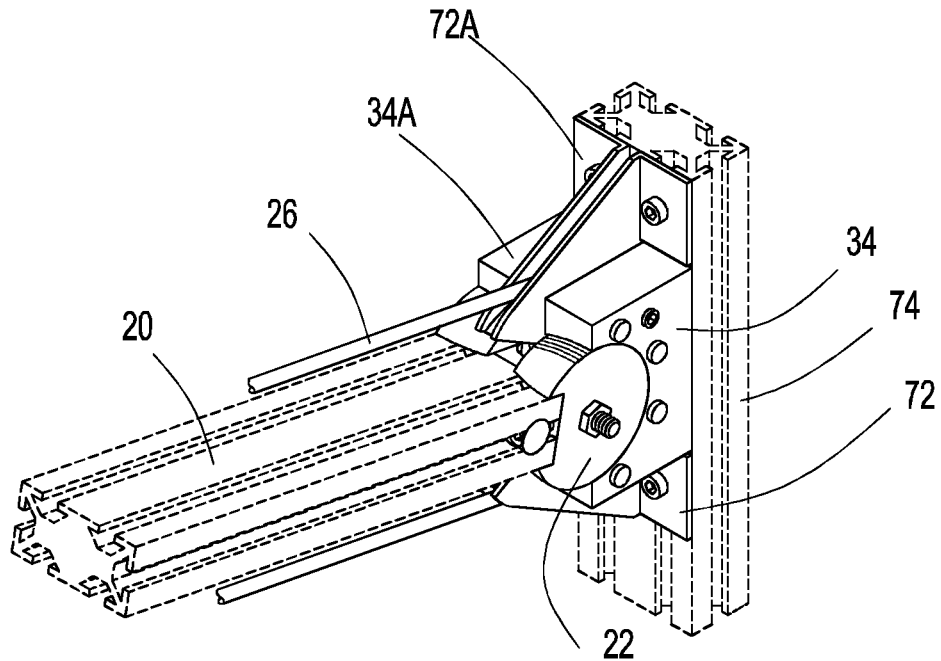
FIG. 8 is a perspective view of the third embodiment
Figure 9:
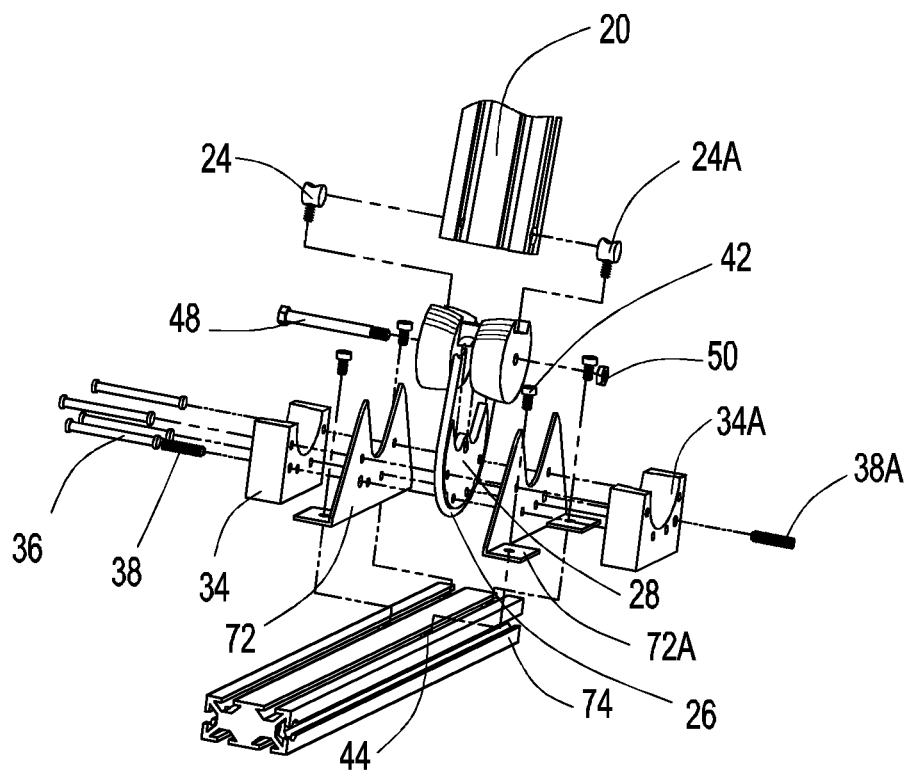
FIG. 9 is an exploded view of the third embodiment.

FIGS. 8 and 9 illustrate an embodiment whereby torque arms 32 and 32A have been replaced with torque arms 72 and 72A in which the mounting flanges are at right angles as compared with mounting flanges of torque arms 32 and 32A. Rotating t-slotted extrusion 40 is replaced by rotating t-slotted extrusion 74 in which the holes for mounting attachments 46 and 46A are omitted. The effect of these modifications is to change the mounting orientation of the rotating t-slotted extrusion with respect to the fixed t-slotted extrusion from roughly parallel to roughly perpendicular. A large variety of components or extrusions can be actuated by the design of adapters which attach to torque arms 72 and 72A.

Fourth Embodiment

Figure 10:
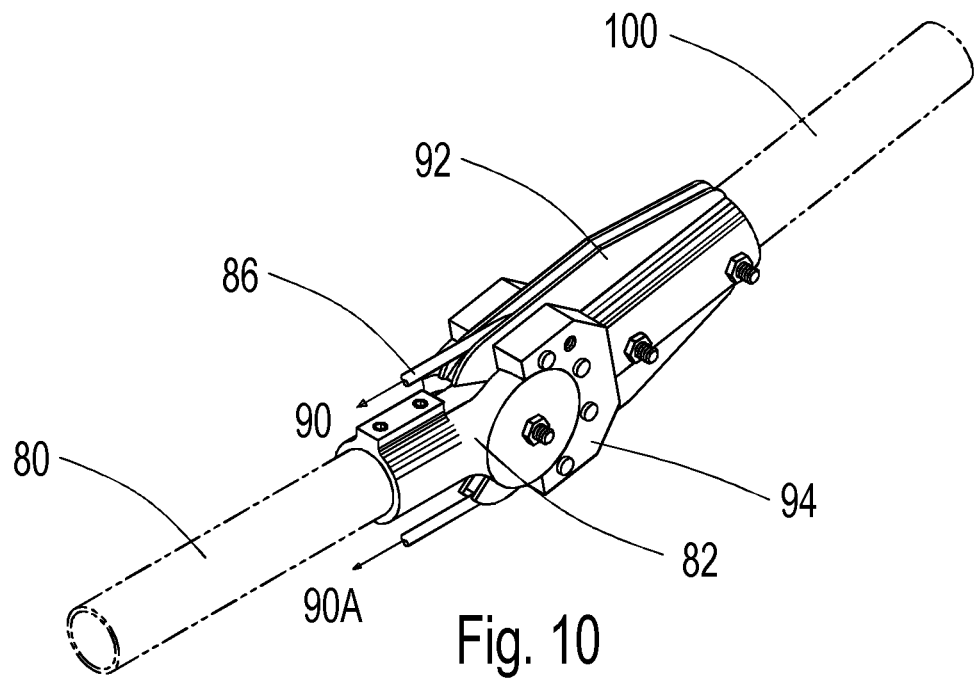
FIG. 10 is a perspective view of the fourth embodiment.
Figure 11:
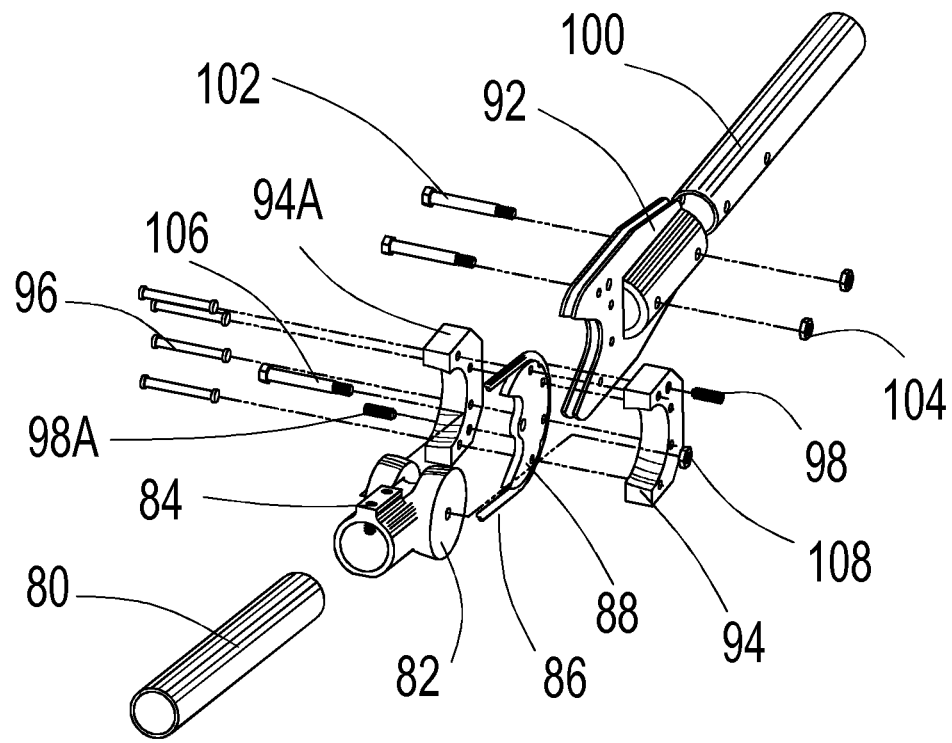
FIG. 11 is an exploded view of the fourth embodiment.

FIGS. 10 and 11 illustrate a fourth embodiment of the hinged joint wherein a tube 80 is inserted into a tubular cavity within a condyle set 82 and secured therein by setscrews 84.

A cord 86 is wrapped around a pulley 88, with this cord 86 being subject to a tensile force 90 and an antagonistic tensile force 90A. A torque arm set 92 sandwiches the pulley 88. Sockets 94 and 94A are adjacent to the exterior faces of torque arm set 92. Sockets 94 and 94A, torque arm set 92, and pulley 88 are all affixed together with shear fasteners 96. Set screws 98 and 98A retain cord 86 in an immobilized state with respect to torque arm set 92.

A rotating tube 100, which is the desired output member of this fourth embodiment, is inserted into a socket in torque arm set 92, and secured in place by shear fasteners 102 with nuts 104. A pin-type fastener is inserted through condyle set 82 and pulley 88 such as to retain pulley 88 with respect to condyle set 82 when tensile forces 90 and 90A are not present.

Alternate Embodiments

I have described several joints which connect into standardized t-slotted extrusion as is commercially available and a joint which connects to structural tubing. The joint can be used with many other extrusions and formed sections providing only that the means of attachment are modified.

CONCLUSION, RAMIFICATIONS, AND SCOPE

The reader will see that at least one embodiment of the joint allows fluidic muscles to find more widespread acceptance due to the robust, simple design which is easily installed. The joint should free designers to use these fluidic muscles in a wide variety of rotary actuator applications which would include articulated robotic type applications, underwater applications, industrial actuator applications, and many other uses.

I would hope that the useful access to the benefits of these fluidic muscles would fuel a search for a practical electric powered muscle which could operate more efficiently than the fluidic muscle and ultimately pave the way for a useful ornithopter (flapping wing flying machine) which I believe can ultimately provide a more efficient form of powered flight than either propeller or jet propelled aircraft.

While the above description contains many specificities, these should not be construed as limitations on the scope, but rather as an exemplification of several embodiments of the hinged joint. Many other variations are possible. For example, a similar joint which attaches to rectangular tubing would be relatively simple to design. Also, although the fluidic muscle is mentioned throughout, the joint is suitable for use with any tensile agonist-antagonist input forces, regardless of the origin of these forces. Accordingly, the scope should be determined not by the embodiments illustrated, but by the appended claims and their legal equivalents.

I claim:

1. A hinged joint, comprising
   a. a condyle set which includes a means for attachment to the end of a long structural member,
   b. a pair of sockets with lubricious surface characteristics with respect to said condyle set, into which rest said condyle set,
   c. a pulley,
   d. a flexible cord which passes around said pulley and is capable of being subject to tensile urges on either end,
   e. a torque arm with means for attachment to a structural member which is to be rotated,
   f. a means of transferring the sum of said tensile urges exerted in said cord into said sockets for the purpose of being reacted by said condyle set and,
   g. a means for transferring the difference of said tensile urges in said cord acting about the center of rotation of said sockets riding in said condyle set into a torsional urge in said torque arm.

2. The hinged joint of claim 1 whereby a pin-type fastener passes through a hole in said condyle set and a hole in said pulley.

3. The hinged joint of claim 1 whereby said long structural member is a t-slotted extrusion.

4. The hinged joint of claim 1 whereby said structural member which is to be rotated is a t-slotted extrusion.

5. The hinged joint of claim 1 whereby said sockets attain their lubricious surface characteristics with respect to said condyle set by means of a film containing PTFE.

6. The hinged joint of claim 1 whereby said long structural member is a round tube.

7. The hinged joint of claim 1 wherein said tensile urges originate from a plurality of fluidic muscles, the opposite end from the cord of which is attached by means of a connecting member to said long structural member.

8. A system comprising the hinged joint of claim 1 and
   a. the urging force acting in said cord resulting from a plurality of fluidic muscles arranged in agonist-antagonist fashion, each of which is attached at its distal end to said long structural member and,
   b. means for controlling fluid pressure in said fluidic muscles whereby said fluid pressure in any of said fluidic muscles may exhibit only one of three states at a time, said three states being actuated pressure, exhausted to atmosphere, and slack-takeup pressure.

9. The hinged joint of claim 1 wherein the functions of pulley, torque arm, and socket have been incorporated into a single part which performs the same function as the aforementioned pulley, torque arm and socket combined together.

* * * * *